(12) United States Patent
Pratt et al.

(10) Patent No.: US 8,494,537 B2
(45) Date of Patent: Jul. 23, 2013

(54) SYSTEM AND METHOD FOR DISPLAY TIMEOUT ON MOBILE COMMUNICATION DEVICES

(75) Inventors: James Pratt, Round Rock, TX (US); Marc A. Sullivan, Austin, TX (US); Elizabeth Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/591,112

(22) Filed: Aug. 21, 2012

(65) Prior Publication Data

US 2012/0315963 A1    Dec. 13, 2012

Related U.S. Application Data

(63) Continuation of application No. 12/136,940, filed on Jun. 11, 2008, now Pat. No. 8,249,660.

(51) Int. Cl.
*H04B 1/38*    (2006.01)

(52) U.S. Cl.
USPC ........................................ 455/450; 455/550.1

(58) Field of Classification Search
USPC .......... 455/550.1, 566, 450; 345/207; 370/535
See application file for complete search history.

(56) References Cited

U.S. PATENT DOCUMENTS

2006/0026601 A1* 2/2006 Solt, Jr. .................... 719/313
2008/0218535 A1* 9/2008 Forstall et al. ............ 345/690

* cited by examiner

*Primary Examiner* — Sam Bhattacharya
(74) *Attorney, Agent, or Firm* — Hartman & Citrin LLC

(57) ABSTRACT

A mobile communication device includes executable instructions for carrying out a method including setting a time duration for an application, receiving a first input, receiving a second input, determining the elapsed time between the first and second inputs, modifying the time duration based upon the elapsed time, and dimming a screen of the mobile device when the elapsed time exceeds the time duration.

19 Claims, 3 Drawing Sheets

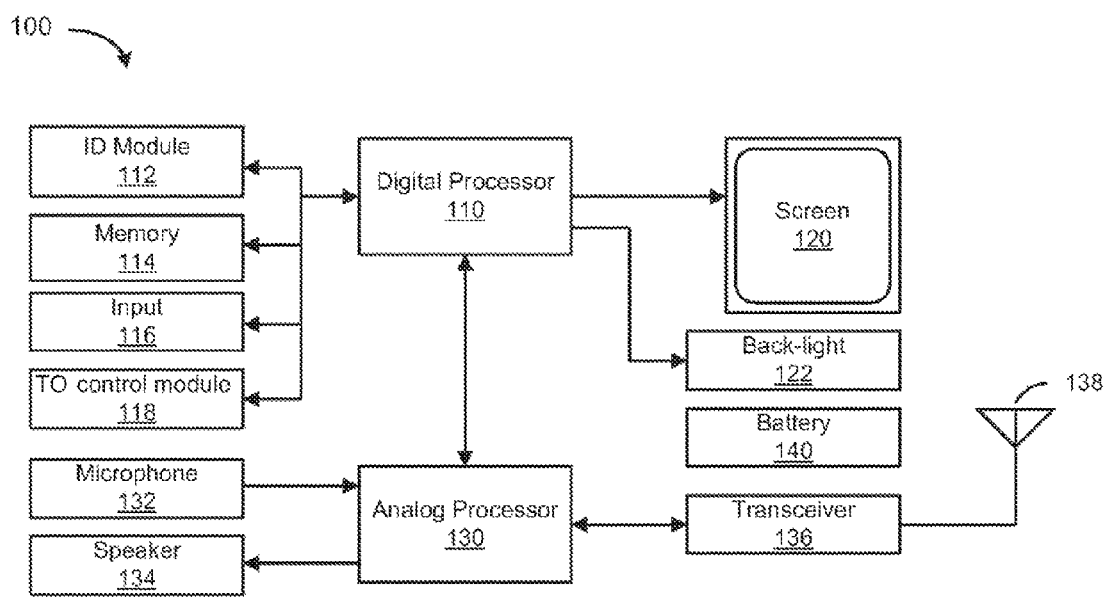
*FIG. 1*
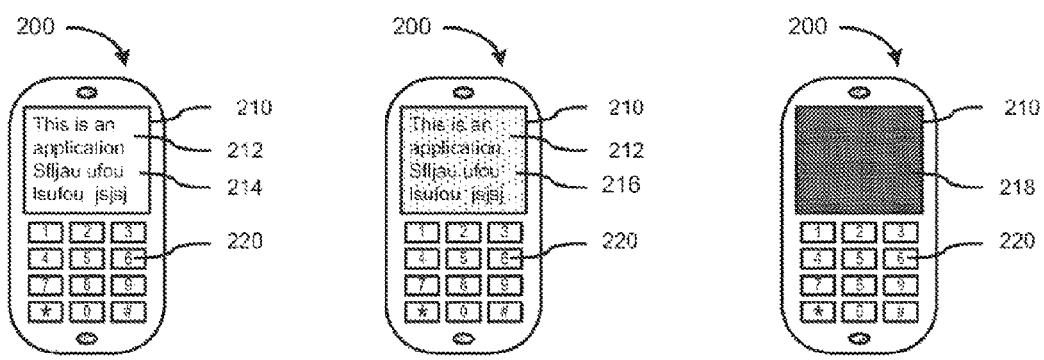
*FIG. 2*     *FIG. 3*     *FIG. 4*

SYSTEM AND METHOD FOR DISPLAY TIMEOUT ON MOBILE COMMUNICATION DEVICES

This application is a continuation of U.S. application Ser. No. 12/136,940, filed Jun. 11, 2008, now U.S. Pat. No. 8,249,660, the content of which is incorporated by reference herein in its entirety into this disclosure.

FIELD OF THE DISCLOSURE

The present disclosure generally relates to mobile communications devices, and relates more particularly to power management of mobile communications devices.

BACKGROUND

Mobile communication devices are becoming more useful in terms of available features, data processing, and Internet connectivity. However, this growth in usefulness is accompanied by increased power consumption and reduced battery life. The reduced battery life and the corresponding reduced time between battery recharges can result in a poor user experience.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 illustrates a block diagram of a mobile communication device that embodies aspects of the present disclosure.

FIG. 2 illustrates a cellular telephone in a normal operating mode in accordance with one embodiment of the present disclosure.

FIG. 3 illustrates a cellular telephone in a dimmed mode in accordance with one embodiment of the present disclosure.

FIG. 4 illustrates a cellular telephone in a no-application mode in accordance with one embodiment of the present disclosure.

The use of the same reference symbols in different drawings indicates similar or identical items.

DETAILED DESCRIPTION OF THE DRAWINGS

Figure 5:
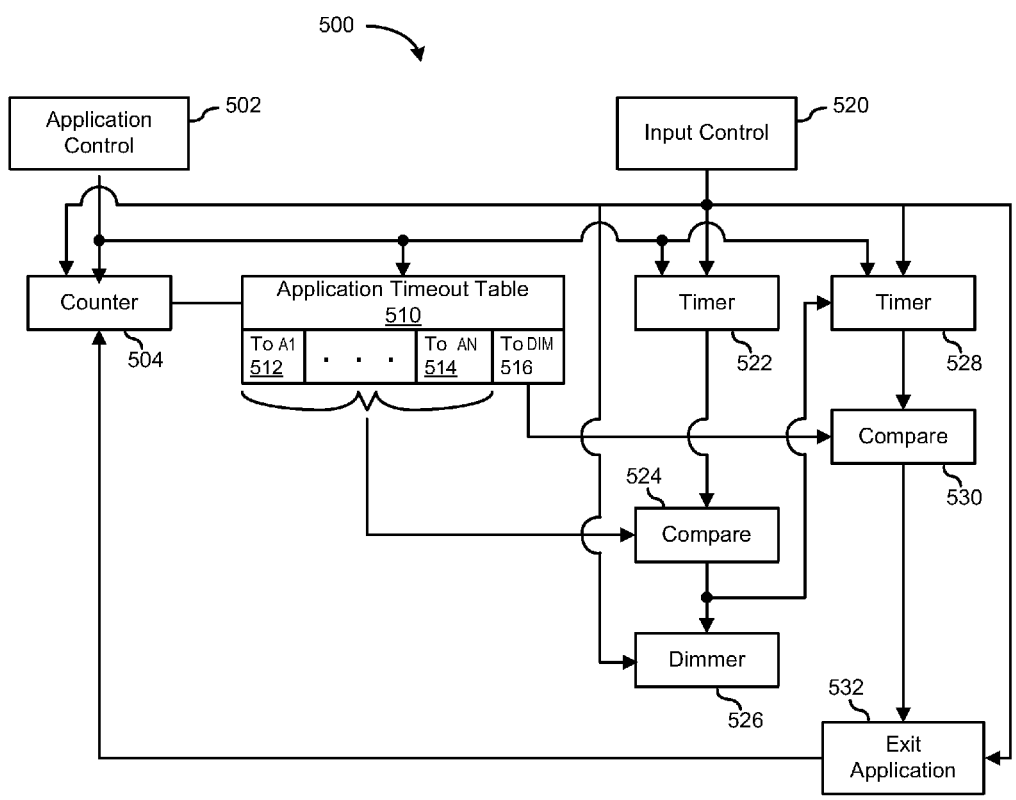
FIG. 5 illustrates a logical block diagram of a timeout control module that embodies aspects of the present disclosure.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some innovative features but not to others.

A mobile communication device is a portable, battery operated electronic device used for mobile voice and data communication applications over a wireless (radio) network. A non-limiting example of a mobile communication device includes a cellular telephone, a personal digital assistant (PDA), a tablet personal computer (PC), an ultra-mobile PC, or other mobile computing or communication devices. A mobile communication device can typically include voice communication applications and other telephony applications such as caller identification, conference calling, Personal Communications Services (PCS), walkie-talkie, other telephony applications, or any combination thereof. A mobile communications device can also include data communication applications like text messaging, e-mail, file transfer, on-demand or continuous Internet access, other data communication applications, or any combination thereof. Further, a mobile communications device can include special applications like digital camera, music player, picture storage, voice and video recorder, flashlight, other special applications, or any combination thereof.

FIG. 1 illustrates a non-limiting example of a block diagram of a mobile communication device that embodies aspects of the present disclosure, shown generally as 100. The mobile communication device 100 includes a digital processor 110, an identity module 112, a memory 114, an input 116, a timeout control module 118, a screen 120, a backlight 122, an analog processor 130, a microphone 132, a speaker 134, a transceiver 136, an antenna 138 and a battery 140. The digital processor 110 is coupled to the identity module 112, the memory 114, the input 116, the timeout control module 118, the screen 120, and the backlight 122. The mobile communication device 100 is also coupled to the analog processor 130. The analog processor 130 is also coupled to the microphone 132, the speaker 134 and the transceiver 136. The transceiver 136 is also coupled to the antenna 138. The battery 140 supplies power to all of the parts of the mobile communication device 100.

The digital processor 110 functions to control the parts of the mobile communication device 100, manage data communication between the parts of the mobile communication device 100, and execute the applications of the mobile communication device 100. The identity module 112 provides a storage medium for user information, such as wireless network account information, personal data (e.g., contact information, calendar, etc.), photos, other user information, or any combination thereof. A non-limiting example of an identity module 112 can include a Subscriber Identity Module (SIM card), a Universal Integrated Circuit Card (UICC), another module or card with user information contained therein, or any combination thereof. The memory 114 operates to store code that is executable by the digital processor 110 to perform the various applications of the mobile communication device 100 (e.g., voice and data communication applications, special applications, etc.) The memory 114 can also operate to store data (e.g., audio and video file, text message, etc.) that is used by the various applications of the mobile communication device 100.

The input 116 provides a way for a user of the mobile communication device 100 to interact with the mobile communication device 100. The input 116 can include devices disposed within the mobile communications device 100, such as a number pad, a QRTY keyboard, a touch screen, a position sensor, a proximity sensor, another input device or any combination thereof. The input 116 can also include a data device that is coupled externally to the mobile communications device 100 (not illustrated), such as a Universal Serial Bus (USB) device, a personal area network device (e.g., IEEE 802.15, Bluetooth, etc.), another external data device, or any combination thereof. The timeout control module 118 dynamically updates application timeouts for improved power management, and improved user experience.

The screen 120 provides a way to display information to the user of a mobile communication device 100. The screen 120 can display a menu page, a screensaver, personal data, other information, or any combination thereof. The screen 120 can be a light emitting diode (LED) matrix type display, an LCD screen, another suitable display type or any combination thereof. The backlight 122 functions to increase the contrast between the contents displayed on the screen 120 and the background of the screen 120. The backlight 122 can include a lamp element, an LED, another suitable light source, or any combination thereof. The backlight 122 can also be included as part of the screen 120, as, for example, when the screen 120 is of an LED matrix type. In such cases, a procedure can control the brightness of the screen 120 to increase or decrease contrast between the contents displayed on the screen 120 and the background.

The analog processor 130 functions to control the analog information provided to or provided from the mobile communication device 100. As such, the analog processor 130 can include analog-to-digital converters to translate analog information from the microphone 132 or from the transceiver 136 into a digital form and communicate the translated information to the digital processor 110. The analog processor 130 can also include digital-to-analog converters to translate digital information from the digital processor 110 into an analog form and communicate the translated information to the speaker 134 or the transceiver 136. The microphone 132 receives audible analog inputs from a user of the mobile communication device 100. A non-limiting example of an audible analog input includes audio recording, voice communication, another audible analog input, or any combination thereof. The speaker 134 sends audible analog outputs to a user of the mobile communication device 100. A non-limiting example of an audible analog output includes audio playback, voice communications, another audible analog output, or any combination thereof. The transceiver 136 functions to enable two-way voice and data communications over a specified radio band. The antenna 138 functions to broadcast and receive radio signals. The battery 140 provides operating power to the mobile communication device 100. The battery 140 can be of a rechargeable type.

The mobile communication device 100 performs applications as requested by the user of the mobile communication device 100. The applications take the form of code stored in the memory 114 and executed by the digital processor 110. A typical application involves interaction with the user of the mobile communication device 100, such as displaying information to the user on the screen 120, and obtaining information from the user via the input 116. Because the mobile communication device 100 is often used in situations where a high contrast is desired between the information displayed on the screen 120 and the background of the screen 120, the mobile communication device 100 lights the backlight 122 to increase the contrast. Whether implemented as a light source, a procedure to increase contrast by brightening the information on the screen 120, or some other means, lighting the backlight 122 can increase the amount of power required from the battery 140.

The timeout control module 118 functions to reduce the amount of time that the backlight 122 is lit, and thereby improve battery 140 performance. Each application on the mobile communication device 100 is associated with an application timeout that controls how long the backlight 122 remains lit. While the user is interacting with the application, (by e.g., interacting with the input 116, a voice command, a motion input, etc.), the backlight 122 will remain lit. When the user interaction ceases, the timeout control module 118 waits for an amount of time determined by the application timeout and then dims the backlight 122. The timeout control module 118 also dynamically updates the application timeouts, to increase or decrease them based upon the user's particular usage patterns. In this way, battery 140 performance is improved, and the user experience is improved for the particular user.

FIGS. 2-4 illustrate a cellular telephone 200 as an example of a mobile communication device 100 that embodies aspects of the present disclosure. The cellular telephone 200 includes a screen 210 and a keypad 220. FIG. 2 illustrates a normal mode 214 of operation where the cellular telephone 200 is being used to perform an application, the screen 210 is displaying content 212, and the back-light (not illustrated) is on, resulting in a high image contrast between the content 212 and the screen 210. FIG. 3 illustrates a dimmed mode 216 of operation where the cellular telephone 200 is being used to perform an application, the screen 210 is displaying content 212, and the back-light is off, resulting in a low image contrast between the content 212 and the screen 210. FIG. 4 illustrates a no-application mode 218 of operation where the cellular telephone 200 as not being used to perform an application, and the darkened screen indicates that both the screen 210 and the backlight are off.

In an embodiment of the present disclosure, a user can choose to perform one of the available applications with the cellular telephone 200, and the appropriate content 212 can be displayed on the screen 210 in the normal mode 214. While the user continues to provide input to the cellular telephone 200, as, for instance, by pressing keys on the keypad 220, the cellular telephone 200 can continue to display the appropriate content 212 in the normal mode 214. However, the user can cease to provide input to the cellular telephone 200, and a timeout control module (not illustrated) that can function similarly to the timeout control module 118 can determine an application timeout value for the chosen application, wait for an amount of time that is substantially equal to the application timeout value and then enter the dimmed mode 216. If the user provides no further input, the timeout control module can determine a dimmed timeout value for the dimmed mode 216, wait for an amount of time that is substantially equal to the dimmed timeout value and then exit the chosen application and enter the no-application mode 218. On the other hand, if the user provides an input, the cellular telephone 200 can be returned to the normal mode 214. The user can also choose to enter the no-application mode 218 by exiting the application (e.g., by providing a specified input that is distinct from other inputs that indicates a desire to exit the application).

The timeout control module 118 can include a different application timeout value for each application of the cellular telephone 200. In this way, the application timeout values can be more closely matched to the needs of the user and the selected application. For example, the application timeout value for entering text in a text messaging application can be less than the application timeout value for reading a full screen 210 of e-mail in an e-mail application. Thus, the various application timeout values associated with each application can be customized to balance power savings with user satisfaction. The application timeout values can be pre-set at the factory, and can be customized by the user to suit personal preferences.

In another embodiment, the timeout control module 118 can dynamically update the application timeout values based upon the usage habits of the user. Here, when the user chooses to perform an available application with the cellular telephone 200, the timeout control module 118 can start a counter to measure the amount of time that the user spends using the cellular telephone 200 for the chosen application. An input to the cellular telephone 200 that occurs while the cellular telephone 200 is in the normal mode 214 can operate to reset and restart the counter. An input to the cellular telephone 200 that occurs while the cellular telephone 200 is in the dimmed mode 216 can operate as described above to return the cellular telephone 200 to the normal mode 214. However, when the cellular telephone 200 enters the no-application mode 218, the timeout control module 118 can update the application timeout value for the chosen application based upon the value of the counter. In this way, the timeout control module can update the application timeout values to more closely match the way the user uses the cellular telephone 200.

In one embodiment, the timeout control module 118 can update the application timeout values in several ways. For example, the application timeout value for a particular application may be updated to substantially equal the counter value less the dimmed timeout value each time the cellular telephone enters the no-application mode 218. Here, $$TO_{NEW} \approx C - TO_{DIM} - K$$

where $TO_{NEW}$ is the new application timeout value, C is the counter value, $TO_{DIM}$ is the dimmed timeout value and K is a correction factor. The correction factor, K, can be a predetermined value defined by the manufacturer of the mobile communication device 100, or can be a user setting on the mobile communication device 100. When K equals zero (0), $TO_{NEW}$ for a particular application will substantially reflect the time duration of the previous use of the particular application. When K is greater than zero (>0), and $TO_{NEW}$ for a particular application will substantially reflect the previous use of the particular application shortened by a duration equal to K.

In another embodiment, the application timeout value for a particular application may also be updated to substantially equal the average of the counter value less the dimmed timeout value and the previous application timeout values. Here, $$TO_{NEW} \approx \frac{(C - TO_{DIM}) + TO_{N-1} + TO_{N-2} + \ldots + TO_1}{N} - K$$

where $TO_{N-1}$, $TO_{N-2}$, ..., $TO_1$ are the application timeout values from the N–1 previous calls to the particular application. When K equals zero (0), $TO_{NEW}$ for a particular application will substantially reflect the average time duration of the previous N uses of the particular application. When K is greater than zero (>0), and $TO_{NEW}$ for a particular application will substantially reflect the average time duration of the previous N uses of the particular application shortened by a duration equal to K.

FIG. 5 illustrates a non-limiting example of a logical block diagram of a timeout control module 118 that embodies aspects of the present disclosure, shown generally as 500. The timeout control module 500 includes an application-control 502, a counter 504, an application-timeout-table 510, an input-control 520, a timer 522, a compare-operation 524, a dimmer 526, a timer 528, a compare-operation 530 and an exit-application-operation 532. The application-control 502 is coupled to the counter 504, the application-timeout-table 510, and the timers 522 and 528. The input-control 520 is coupled to the counter 504, the timers 522 and 528, the dimmer 526, and the exit-application-operation 532. The counter 504 is coupled to the application-timeout-table 510. The application-timeout-table 510 is coupled to the compare-operations 524 and 530. The timer 522 is coupled to the compare-operation 524. The compare-operation 524 is coupled to the dimmer 526 and to the timer 528. The timer 528 is coupled to the compare-operation 530. The compare-operation 530 is coupled to the exit-application-operation 532. The exit-application-operation 532 is coupled to the counter 504.

The mobile communication device 100 can operate to perform a first application $A_1$, and one or more additional applications, generally designated as an $n^{th}$ application $A_N$. The application-timeout-table 510 includes a table-entry 512 for the first application $A_1$, and one or more additional table-entries 514 for each of the one or more additional applications $A_N$ implemented on the mobile communication device 100. Each table-entry 512 through 514 contains an application timeout value that is associated with each application (e.g., table-entry 512 contains an application timeout value $TO_{A1}$ for the first application $A_1$, and table-entry 514 contains an application timeout value $TO_{AN}$ for the $n^{th}$ application $A_N$). The application-timeout-table 510 also includes a table-entry 516 for a screen dimming application $A_{DIM}$ that contains a dimmed timeout value $TO_{DIM}$. The compare operation 524 is coupled to a selected table-entry 512 or 514, and the compare-operation 528 is coupled to table-entry 516, as described below.

When a user of the mobile communication device 100 chooses to perform an application on the mobile communication device 100, the application-control 502 recognizes that an application has been chosen, sets the mobile communication device 100 into a normal mode similar to the normal mode 214, resets the counter 504, and the timers 522 and 528, and starts the counter 504 and the timer 522. The application-control 502 also recognizes which application is chosen and directs the application-timeout-table 510 to select a table entry 512 through 514 and send the associated application timeout value to the compare-operation 524. For example, if the user chose $A_1$, then the application-control 502 directs the application-timeout-table 510 to select table entry 512 and send the application timeout value $TO_{A1}$ to the compare-operation 524. The application-timeout-table 510 also sends the dimmed timeout value $TO_{DIM}$ from the table-entry 516 to the compare-operation 530.

The compare-operation 524 will compare the application timeout value from the table entry 512 or 514 with the value from the timer 522. When the value from the timer 522 reaches the value from the table entry 512 or 514 (e.g., when $TO_{A1}$ or $TO_{AN}$ amount of time has elapsed), the compare-operation 524 initiates the dimmer 526 to dim the backlight 122, thus setting the mobile communication device 100 into a dimmed mode similar to the dimmed mode 216, and starts the timer 528. The compare-operation 530 will compare the application timeout value from the table entry 516 with the value from the timer 528. When the value from the timer 528 reaches the value from the table entry 516 (e.g., when $TO_{DIM}$ amount of time has elapsed), the compare-operation 530 initiates the exit-application-operation 532. The exit-application-operation 532 functions to set the mobile communication device 100 into a no-application mode similar to the no-application mode 218, stop the counter 504, and write a new application timeout value $TO_{A1}$ or $TO_{AN}$ into the table entry 512 or 514 that is associated with the chosen application that is based upon the value of the counter (e.g., substantially equal the counter value less $TO_{DIM}$, substantially equal the average of the counter value less $TO_{DIM}$, and the previous application timeout value, etc.)

When the input-control 520 recognizes that the mobile communication device 100 has received an input, the input-control 520 can determine if the compare-operation 524 has initiated the dimmer 526 to dim the backlight 122, and started the timer 528. If not, the input-control 520 can reset and restart the timer 522 and the counter 504. In this way, the timeout control module 500 handles inputs to the mobile communication device 100 that happen before the application timeout as if the chosen application were restarted, and the time duration between inputs will not be added to the updated timeout value for the chosen application.

If the compare-operation 524 has initiated the dimmer 526, and started the timer 528, then the input-control 520 can reset and restart the timers 522 and 528, and signal the dimmer 526 to un-dim the backlight 122, thus setting the mobile communication device 100 into the normal mode. In this way, the timeout control module 500 handles inputs to the mobile communication device 100 that happen after the application timeout as if the chosen application were continuing, and the time duration between inputs will be added to the updated timeout value for the chosen application.

The input-control 520 can also function to recognize a specified input that is distinct from other inputs that indicate a desire to exit the application. In this case, the input-control 520 can initiate the exit-application-operation 532 to set the mobile communication device 100 into the no-application mode, stop the counter 504, and write a new application timeout value $TO_{A1}$ or $TO_{AN}$ into the table entry 512 or 514. The skilled artisan will recognize that the operation of the timeout control module 500 can be implemented in hardware, software, firmware, or any combination thereof.

The skilled artisan will further appreciate that the functionality of the timeout control modules 118 or 500 can be implemented in hardware, in software, in firmware, or in any combination thereof. In addition, the skilled artisan will recognize that the timeout control module 500 is a non-limiting illustration of a particular embodiment of the present disclosure, and that, without undue experimentation, other embodiments can be crafted by the skilled artisan. As such, the elements described are illustrative of functions performed by the timeout control modules 118 or 500, and that such functions can be combined or split up to meet the particular needs of the mobile communication device 100. For example, while the dimmer 526 is illustrated as an element of the timeout control module 500, a similar functionality can be implemented wherein the dimmer 526 is included as a procedure call residing in the memory 114, or another element of the mobile communication device 100. Also, while the counter 504, and the timers 522 and 528 are illustrated as separate elements of the timeout control module 500, similar functionality can be implemented with a single timing element that is compared to the appropriate timeout values.

Figure 6:
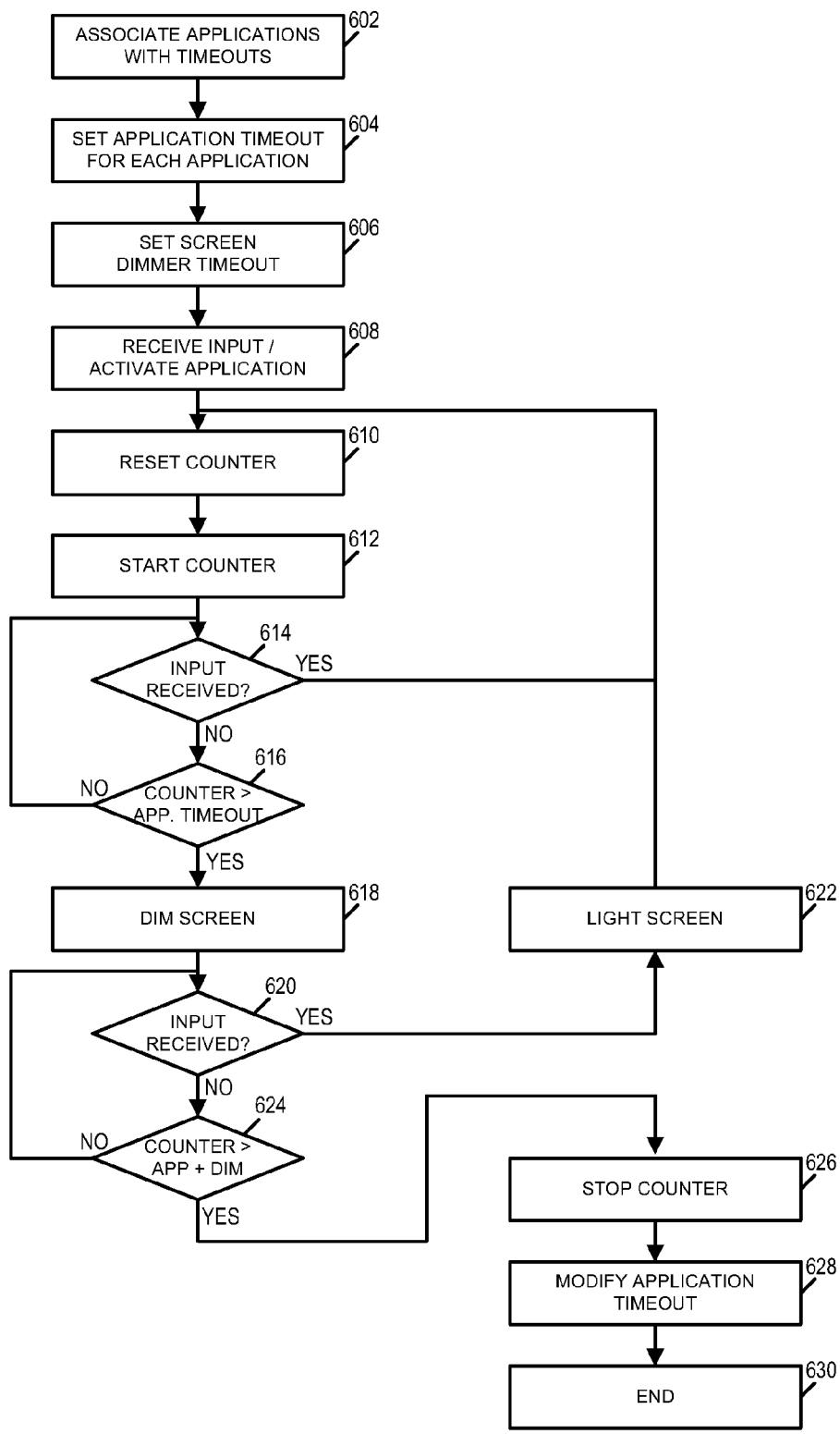
FIG. 6 illustrates a particular embodiment of a method of dynamically updating application timeouts in a mobile communication device in a flow chart form.

FIG. 6 illustrates an embodiment of a method of dynamically updating application timeouts in a mobile communication device 100 in a flow chart form. An association between the applications on a mobile communication device 100 is made with the application timeouts in block 602, and the application timeouts are set to initial values for the applications in block 604. A screen dimmer timeout is set to an initial value for the screen dimmer procedure in block 606. The mobile communication device 100 receives an input associated with a particular application, or the particular application is otherwise activated in block 608. A counter is reset in block 610, and the counter is started in block 612.

A decision is made whether a subsequent input has been received by the mobile communication device in decision block 614. If the decision condition of decision block 614 is satisfied, then processing continues in block 610 where the counter is reset. If the decision condition of decision block 614 is not satisfied, then a decision is made whether the value of the counter is greater than the application timeout value for the particular application in decision block 616. If the decision condition of decision block 616 is not satisfied, then processing returns to decision block 614. If the decision condition of decision block 616 is satisfied, then the screen is dimmed in block 618.

A decision is made whether a subsequent input has been received by the mobile communication device in decision block 620. If the decision condition of decision block 620 is satisfied, then the screen is relit in block 622, and processing returns to block 610. If the decision condition of decision block 620 is not satisfied, then a decision is made whether the value of the counter is greater than the sum of the application timeout value for the particular application and the screen dimmer timeout value in decision block 624. If the decision condition of decision block 624 is not satisfied, then processing returns to decision block 620. If the decision condition of decision block 624 is satisfied, then the counter is stopped in block 626, the application timeout value for the particular application is modified in block 628, and processing ends in block 630.

Many different aspects and embodiments of the present disclosure are possible. Some of those aspects and embodiments are described below. After reading this specification, skilled artisans will appreciate that those aspects and embodiments are only illustrative, and do not limit the scope of the present invention.

In accordance with an aspect, a method can include setting a first time duration for a first application in a mobile device, receiving a first input for the first application, receiving a second input for the first application, determining a first elapsed time that is based upon the amount of time that elapsed between the first input and the second input, modifying the first time duration to equal a first modified first time duration based upon the first elapsed time, and dimming a screen disposed within the mobile device in response to the first elapsed time exceeding the first time duration. In an embodiment of the first aspect, the first time duration can be modified when the first elapsed time exceeds the first time duration, and the first modified first time duration can equal the first elapsed time.

In another embodiment of the first aspect, the first modified first time duration can equal the average of the first time duration and the first elapsed time. In a different embodiment of the first aspect, the first modified first time duration can equal the average of the first time duration and the first elapsed time less a correction factor. In yet another embodiment of the first aspect, the method can include setting a second time duration for a second application in the mobile device, receiving a third input for the second application, receiving a fourth input for the second application, determining a second elapsed time that is equal to the amount of time that elapsed between the third input and the fourth input, and modifying the second time duration to equal a modified second elapsed time based upon the second elapsed time. In a further embodiment of the first aspect, the mobile device can be a cellular telephone. In still another embodiment of the first aspect, the method can further include halting the first application, receiving a third input for the first application that restarts the first application, receiving a fourth input for the first application, determining a second elapsed time that is based upon an amount of time that elapsed between the third input and the fourth input, modifying the first modified first time duration to equal a second modified first time duration based upon the second elapsed time, and dimming the screen in response to the second elapsed time exceeding the first modified first time duration.

In accordance with a second aspect, a mobile communication device can include a processor, a display, and a memory that includes processor-executable code that includes instructions executable by the processor for carrying out a method that can include setting a first time duration for a first application in the mobile communication device, receiving a first input for the first application, receiving a second input for the first application, determining a first elapsed time that is equal to the amount of time that elapsed between the first input and the second input, modifying the first time duration to equal a modified first time duration based upon the first elapsed time, and dimming the display when the first elapsed time exceeds the first time duration.

In an embodiment of the second aspect, the method can be such that the first time duration is modified when the first elapsed time exceeds the first time duration, and the modified first time duration can equal the first elapsed time. In another embodiment of the second aspect, the method can be such that the modified first time duration can equal the average of the first time duration and the first elapsed time. In a further embodiment of the second aspect, the method can be such that the modified first time duration can equal the average of the first time duration and the first elapsed time plus a lag time. In still another embodiment of the second aspect, the method can further include setting a second time duration for a second application in the mobile communication device, receiving a third input for the second application, receiving a fourth input for the second application, determining a second elapsed time that is equal to the amount of time that elapsed between the third input and the fourth input, and modifying the second time duration based upon the second elapsed time. In another embodiment of the second aspect, the mobile communication device can be a cellular telephone.

In accordance with a third aspect, a method can include associating a time duration with an application of a mobile communication device, setting a value for the time duration, activating the application, determining the amount of time that elapses between the activating of the application and an input to the application, determining if the time that elapses exceeds the value for the timer duration, dimming a screen of the mobile communication device in response to determining that the time that elapses exceeds the value, and modifying the value to equal a modified value based upon the amount of time that elapses between the activating of the application and the input. In an embodiment of the third aspect, the value can be modified when the amount of time that elapses exceeds the value, and the modified value can be equal to the amount of time that elapses.

In another embodiment of the third aspect, the modified value can equal the average of the value and the amount of time that elapses. In still another embodiment of the third aspect, the modified value can equal the average of the value and the amount of time that elapses plus a lag time. In a further embodiment, the lag time can be determined by a user. In yet another embodiment of the third aspect, the mobile communication device can be a cellular telephone.

In a fourth aspect, a method can include receiving a first input in a mobile communication device, starting a first counter in response to receiving the first input, dimming a screen disposed within the mobile communication device in response to the counter counting to a first value that is equal to a first threshold, receiving a second input in the mobile communication device, stopping the first counter in response to receiving the second input, determining a second value of the counter in response to stopping the first counter, and modifying the first threshold to equal a modified first threshold that is based upon the second value. In an embodiment of the fourth aspect, the method can further include stopping the first counter in response to the counter counting to a second value that is equal to a second threshold, the second threshold being greater than the first threshold. In a further embodiment, the modified first threshold can equal the second value. In yet another embodiment, the modified first threshold can equal the average of the first threshold and the second value. In still another embodiment, the modified first threshold can equal the average of the first threshold and the second value plus a time lag.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
receiving a command at an application-timeout-table from an application-control directing the application-timeout-table to select an application timeout value and a table entry associated with an application currently active on a mobile communication device, the application timeout value being set according to at least one of a value pre-set at a factory or a user-customized value;

starting a counter measuring an amount of time of use of the application; and transmitting the application timeout value, the counter, and the table entry to a compare-operation using the application-timeout-table, the compare-operation comparing the received application timeout value with a first value of a first timer, the value of the timer being measured since an activation of the application, and comparing the table entry with a second value associated with a second timer to initiate an exit-application-operation upon the second value reaching a value of the table entry;

wherein the compare-application initiates a dimmer to dim a backlight of the mobile communication device upon the value of the first timer reaching the application timeout value provided by the application-timeout-table;

wherein the second value is measured since the dimming of the backlight;

wherein the exit-application-operation functions to set the mobile communication device into a no-application mode, stop the first timer and the second timer, and write a new application timeout value into the application-timeout-table; and wherein the new application timeout value is equal to the counter less the application timeout value.

2. The method of claim 1, wherein the application-control detects the activation of the application.

3. The method of claim 2, wherein the application-control resets the first timer upon detecting the activation.

4. The method of claim 1, wherein the compare-operation is coupled to the first timer.

5. The method of claim 1, wherein the backlight is at least one of a lamp element or a light emitting diode.

6. The method of claim 1, wherein the mobile communication device is a cellular phone.

7. A method, comprising:

receiving a command at an application-timeout-table from an application-control directing the application-timeout-table to select an application timeout value and a table entry for a screen dimming application, the application timeout value and the table entry being associated with an application currently active on a mobile communication device, the application timeout value being set according to at least one of a value pre-set at a factory or a user-customized value;

starting a counter measuring an amount of time of use of the application; and transmitting the application timeout value, the counter, and the table entry to a compare-operation using the application-timeout-table, the compare-operation comparing the received application timeout value with a first value associated with a first timer and initiating a dimmer to dim a backlight of the mobile communication device upon the first value reaching the application timeout value, the compare-operation further comparing the table entry with a second value associated with a second timer to initiate an exit-application-operation upon the second value reaching a value of the table entry;

wherein the first value is measured since an activation of the application and the second value is measured since the dimming of the backlight;

wherein the exit-application-operation functions to set the mobile communication device into a no-application mode, stop the first timer and the second timer, and write a new application timeout value into the application-timeout-table, and wherein the new application timeout value is equal to the value of the counter less the application timeout value.

8. The method of claim 7, wherein the application-control detects the activation of the application and resets the first value and the second value upon the detection.

9. The method of claim 7, wherein the compare-operation is coupled to the first timer and the second timer.

10. The method of claim 7, wherein the compare-operation is coupled to the exit-application-operation.

11. The method of claim 7, wherein the backlight is at least one of a lamp element or a light emitting diode.

12. The method of claim 7, wherein the mobile communication device is a cellular phone.

13. A mobile communication device comprising:

a processor; and a timeout control module in communication with the processor, the timeout control module including an application-timeout-table, which when executed by the processor, performs functions comprising:

receiving a command from an application-control to select an application timeout value and a table entry for a screen dimming application, the application timeout value and the table entry being associated with an application currently active on a mobile communication device, the application timeout value being set according to at least one of a value pre-set at a factory or a user-customized value;

starting a counter measuring an amount of time of use of the application; and transmitting the application timeout value and the table entry to a compare-operation, the compare-operation comparing the received application timeout value with a first value associated with a first timer and initiating a dimmer to dim a backlight of the mobile communication device upon the first value reaching the application timeout value, the compare-operation further comparing the table entry with a second value associated with a second timer to initiate an exit-application-operation upon the second value reaching a value of the table entry;

wherein the first value is measured since an activation of the application and the second value is measured since the dimming of the backlight;

wherein the exit-application-operation functions to set the mobile communication device into a no-application mode, stop the first timer and the second timer, and write a new application timeout value into the application-timeout-table, and wherein the new application timeout value is equal to the value of the counter less the application timeout value.

14. The mobile communication device of claim 13, further comprising a screen for displaying the application.

15. The mobile communication device of claim 13, wherein the application-control detects the activation of the application.

16. The mobile communication device of claim 13, further comprising a speaker for transmitting an audible signal from the mobile communication device, the audible signal including at least one of an audio playback or a voice communication.

17. The mobile communication device of claim 13, wherein the mobile communication device is a cellular phone.

18. The mobile communication device of claim 13, further comprising a keypad to enable an interaction with the mobile communication device.

19. The mobile communication device of claim 13, further comprising a memory for storing a data to be used by the application, the data being at least one of an audio file, a video file, or a text message.

* * * * *